United States Patent [19]

Yoshimura et al.

[11] Patent Number: 5,424,256
[45] Date of Patent: Jun. 13, 1995

[54] SILICON NITRIDE SINTERED BODY

[75] Inventors: Masashi Yoshimura; Takehisa Yamamoto; Shinichi Yamagata; Jin-Joo Matsui; Akira Yamakawa, all of Itami, Japan

[73] Assignee: Sumitomo Electric Industries, Ltd., Japan

[21] Appl. No.: 138,346

[22] Filed: Oct. 18, 1993

[30] Foreign Application Priority Data

Mar. 17, 1993 [JP] Japan .................................. 5-057055
Apr. 21, 1993 [JP] Japan .................................. 5-117851

[51] Int. Cl.⁶ .................... C04B 35/593; C04B 35/599
[52] U.S. Cl. .......................................... 501/97; 501/98
[58] Field of Search ..................................... 501/97, 98

[56] References Cited

U.S. PATENT DOCUMENTS

| | | | |
|---|---|---|---|
| 4,978,645 | 12/1990 | Ukyo et al. | 501/97 X |
| 5,045,513 | 9/1991 | Mizuno et al. | 501/97 X |
| 5,098,872 | 3/1992 | Suyama et al. | 501/97 |
| 5,204,297 | 4/1993 | Yamamoto et al. | 501/97 |
| 5,238,884 | 8/1993 | Sakai et al. | 501/97 |

*Primary Examiner*—Karl Group
*Attorney, Agent, or Firm*—Jordan B. Bierman; Bierman and Muserlian

[57] ABSTRACT

Silicon nitride sintered bodies consisting of prismatic crystal grains of $Si_3N_4$ and/or sialon, equi-axed crystal grains of $Si_3N_4$ and/or sialon, a grain boundary phase existing among the prismatic and equi-axed crystal grains and dispersed particles in the grain boundary phase, in which the prismatic crystal grains have an average grain size of 0.3 μm or less in minor axis and an average grain size of 5 μm or less in major axis, the equi-axed crystal grains have an average grain size of 0.5 μm or less and the dispersed particles have an average size of 0.1 μm or less, the volume of the dispersed particles being 0.05% by volume or more based on the total volume of the rest of the sintered body. The silicon nitride sintered bodies have a strength sufficient for use as structural materials of machine parts or members, with a minimized scattering of the strength as well as high reliability, superior productivity and advantageous production cost.

4 Claims, 3 Drawing Sheets

SILICON NITRIDE SINTERED BODY

BACKGROUND OF THE INVENTION

1. Field of the Invention

The present invention relates to silicon nitride sintered bodies which have superior mechanical properties at room temperature, with a minimized scattering of the properties, and also good productivity and cost efficiency.

2. Description of the Prior Art

Silicon nitride is a material well balanced in strength, fracture toughness, corrosion resistance, wear resistance, thermal shock resistance and oxidation resistance, etc., and has been extensively used in a wide variety of applications, such as cutting tools, frictionally sliding parts or other structural materials. However, there is the problem that this ceramic material is poor in strength and reliability as compared with metallic materials.

One reason for the poor strength of the silicon nitride sintered body is closely related to the grain boundary phase in the silicon nitride sintered body. The grain boundary phase is composed of a glass phase formed from a sintering aid, which is an indispensable component for sintering silicon nitride. In general, since this glass phase is brittle as compared with the matrix phase of the sintered body, it is highly susceptible to breakage when stress concentration is applied to the grain boundary phase. This causes the lowering of the strength of the sintered silicon nitride sintered body.

Therefore, various methods have hitherto been tried to improve the strength by reducing the grain boundary phase of a silicon nitride sintered body. For example, Japanese Patent Application Laid-Open (Kokai) Nos. 2-70715 and 3-117315 disclose techniques for reducing the thickness of a grain boundary phase by forming a grain-refined structure composed of equi-axed crystal grains of $\alpha$-$Si_3N_4$ and prismatic crystal grains of $\beta$-$Si_3N_4$. However, in order to obtain fine $\alpha$-type crystal grains, a fine $Si_3N_4$ powder having a high $\alpha$-ratio should be used as a starting material powder, resulting in a high production cost. Further, in order to ensure an improved strength properties in the resultant silicon nitride sintered body, the conversion rate to $\beta$-crystallization should be increased by sintering. However, in this sintering process, the $\beta$-type crystal grains grow to 2 $\mu$m or more. Therefore, there is limitation in reducing the grain boundary phase only by the above-mentioned structural refinement technique.

Further, as disclosed in Japanese Patent Laid-Open Nos. 61-91065 and 2-44066, there has been known a method for combining equi-axed $\alpha'$-sialon having the general formula $M_x(Si,Al)_{12}(O,N)_{16}$ wherein M is at least one member selected from the group consisting of Mg, Ca, Li and rare earth elements and prismatic $\beta'$-sialon. This method improves the mechanical properties, such as strength, by the formation of a composite crystal phase. However, as is also apparent from the working examples disclosed in these applications, all the sintered bodies that stably have a bending strength exceeding 100 kg/mm$^2$ are obtained by a hot pressing process and this method is inappropriate to stably ensure high strength properties on an industrial scale.

As a further attempt for achieving an improved strength, fine foreign particles are dispersed in the structure of a silicon nitride sintered body to provide a composite structure. For example, Japanese Patent Laid-Open No. 4-202059 discloses a method in which fine particles having a size of 1 to 500 nm are dispersed in prismatic silicon nitride or sialon having an average minor axis of 0.05 to 3 $\mu$m and an aspect ratio of 3 to 20. However, although the working examples shows 167 kg/mm$^2$ as the highest strength, this method is highly liable to bring about the deterioration of the strength due to the presence of coarse silicon nitride and the Weibull coefficient is about 9 at the highest level. Therefore, there is a problem in stably obtaining high strength properties.

Japanese Patent Laid-Open No. 4-295056 discloses a method for dispersing particles of a foreign substance in the grain boundary phase of prismatic silicon nitride crystal grains. However, in this method, the prismatic silicon nitride crystal grains have a minor axis diameter and major axis diameter reaching, at the most, 2 to 3.5 $\mu$m and 10 to 14 $\mu$m, respectively. Therefore, the matrix per se acts as fracture origins and the strength shown in the working examples is only 158 kg/mm$^2$ at the highest. Further, since a high firing temperature of 1800° C. or higher is required, the method is unsatisfactory also in productivity and cost.

SUMMARY OF THE INVENTION

In view of the problems encountered in the prior art, an object of the present invention is to provide silicon nitride sintered bodies which have a strength sufficient for use as structural materials of machine parts or members, with a minimized scattering of the strength as well as high reliability, superior productivity and advantageous production cost.

In order to achieve the above object, the present invention provides a silicon nitride sintered body consisting of prismatic crystal grains of $Si_3N_4$ and/or sialon, equi-axed crystal grains of $Si_3N_4$ and/or sialon, a grain boundary phase existing among these prismatic and equi-axed crystal grains and particles dispersed in the grain boundary phase, in which the prismatic crystal grains have an average grain size of 0.3 $\mu$m or less in their minor axis and an average grain size of 5 $\mu$m or less in their major axis and the equi-axed crystal grains have an average grain size of 0.5 $\mu$m or less and the dispersed particles have an average particle size of 0.1 $\mu$m or less, the volume of the dispersed particles being 0.05% by volume or more on the basis of the total volume of the rest of the sintered body.

DETAILED DESCRIPTION OF THE PREFERRED EMBODIMENTS

Figure 1:
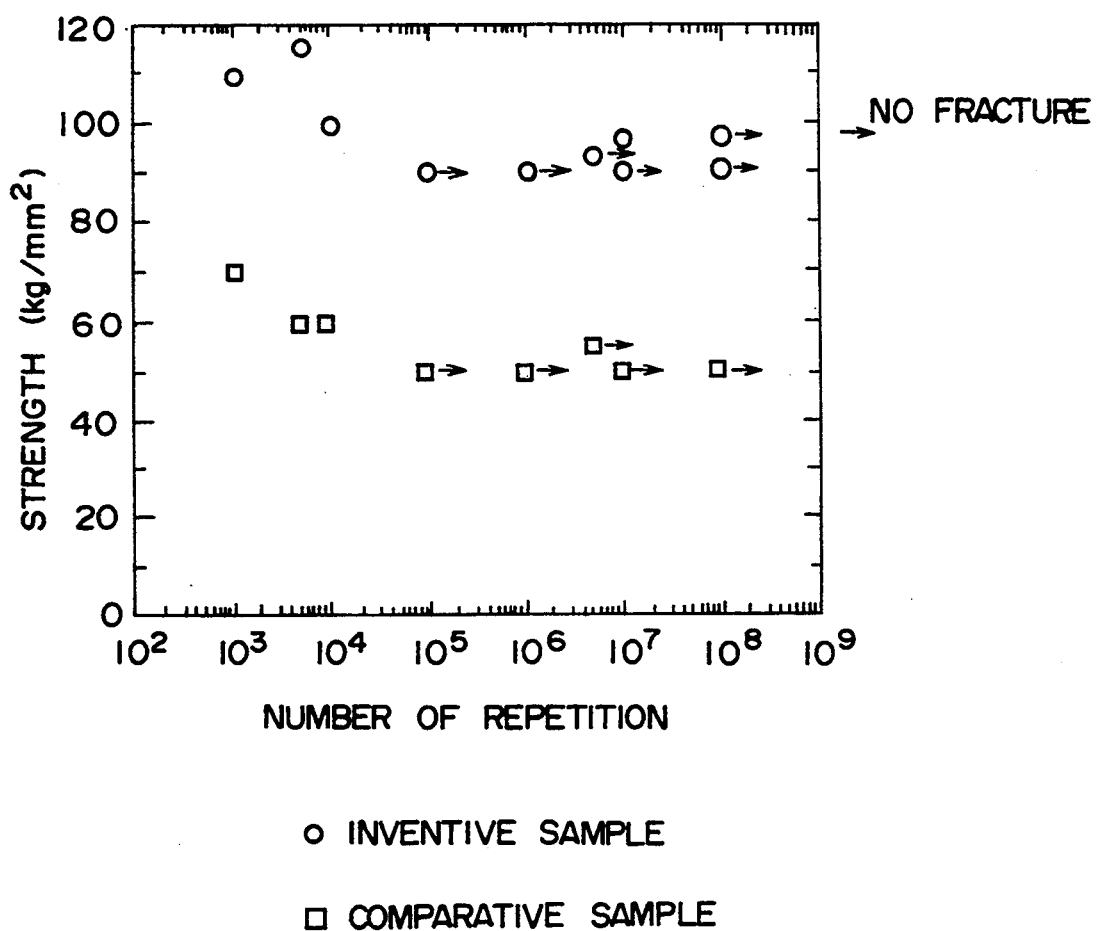
FIG. 1 is a graph showing a rotating bending fatigue limit.

In the present invention, in order to reduce the relative proportion of the grain boundary phase leading to the deterioration of the strength of a silicon nitride sintered body, prismatic crystal grains and equi-axed crystal grains of silicon nitride and/or sialon are combined with a high filling density and, at the same, fine particles are dispersed within the grain boundary phase existing among the prismatic and equi-axed crystal gains. In such a microstructure, the surface area of the grain boundary phase is increased and the relative proportion of the glass phase in reduced. Further, it has been confirmed that, due to the existence of the fine particles dispersed in the grain boundary phase, grain growth can be effectively prevented throughout the overall structure and a refined and uniform structure can be obtained by controlling the grain sizes of the prismatic crystal grains and the equi-axed crystal grains.

Consequently, in the silicon sintered body of the present invention, the prismatic and equi-axed crystal grains of silicon nitride and/or sialon are homogeneously refined and embrittlement in the grain boundary phase can be reduced due to the reduced grain boundary phase. As a result, it is possible to stably ensure a strength of 160 kg/mm$^2$ or higher in terms of the three-point bending strength at room temperature according to JIS (Japanese Industrial Standards) R 1601 together with a high impact strength and an excellent fatigue property. The silicon nitride sintered body having such superior mechanical properties can be obtained at a low cost and in a good productivity. It has also been found that the silicon nitride sintered body of the present invention are very suitable as a material for cutting tools because of its superior cutting properties.

In order to stably obtain the above-mentioned superior strength, it is required that the sintered body contains both of prismatic crystal gains ($\beta$-crystals) and equi-axed crystal grains ($\alpha$-crystals) wherein the prismatic crystal grains have an average grain size of not more than 0.3 $\mu$m in minor axis and not more than 5 $\mu$m in major axis and the equi-axed crystal grains have an average grain size of not more than 0.5 $\mu$m. When the average grain sizes of these crystal grains exceed the respective upper limits, the structure of the sintered body becomes nonuniform and coarse crystal grains act as fracture origins. Further, since the filling density of the prismatic crystal grains and equi-axed crystal grains is reduced and the thickness of the grain boundary phase is increased, strength reduction occurs in the resultant sintered body.

In the present invention, $\alpha'$-sialon and $\beta'$-sialon are solid solution crystal phases, respectively, represented by the general formula of $M_x(Si, Al)_{12}(O, N)_{16}$ (wherein M is at least one member selected from the group consisting of Ti, Ni, Hf, V, Cr, Mg and rare earth elements and $0 < X \leq 2.0$) and the general formula of $Si_{6-z}Al_zO_zN_{8-z}$ (wherein $0 < z \leq 4.2$).

The fine particles dispersed in the grain boundary phase have an average particle size of 0.1 $\mu$m or less and the volume fraction occupied by the dispersed particles in the grain boundary phase should be at least 0.05% by volume on the basis of the total volume of the remaining phases of the sintered body, excluding the dispersed particle phase. When the average particle size of the dispersed particles is greater than 0.1 $\mu$m, besides particles exiting in the boundary grain phase, the quantity of particles existing in the state of triple point or having the same size as the size of the equi-axed crystal grain size increases. Therefore, the relative quantity of the glass phase in the grain phase cannot be reduced and the overall grain growth becomes significant throughout the structure. As a result, desired strength levels cannot be achieved. By controlling the size of the dispersed particles to the above-specified particle size, the dispersed particles exhibit their effect of suppressing the grain growth in the whole structure, thereby providing a uniformly refined structure.

Further, when the volume of the dispersed particles in the grain boundary phase is less than 0.05% by volume based on the total volume of the rest of the sintered structure, the intended properties cannot be obtained since the reduction in the quantity of the glass phase is very small. On the other hand, when the volume of the dispersed particles is excessively large, the average particle size of the dispersed particles unavoidably becomes large. Therefore, it is necessary to control the volume of the dispersed particles in the grain boundary phase so that the average particle size of the particles does not exceed 0.1 $\mu$m, preferably 0.03 $\mu$m or less.

The dispersed particles are compounds other than silicon nitride and sialon. For example, compounds of Ti, Zr, Hf, V, Cr, etc., are used and among them Ti compounds are especially favorable. These compounds were confirmed to be present at least as nitride such as TiN, etc., in the sintered body by X-ray diffraction measurements.

Especially, when the dispersed particles are made of a titanium compound, the volume occupied by of the compound in the grain boundary phase is in the range of 0.05 to 4% by volume, preferably in the range of 0.05 to 2% by volume, on the basis of the total volume of the rest of the sintered body. When the volume percentage of the titanium compound is less than 0.05 by volume, the desired strength level cannot be obtained. On the other hand, when the volume percentage exceeds 4% by volume, the average particle size becomes greater due to the agglomeration of the titanium compound particles and defects are formed. Therefore, the required strength level cannot be achieved. Further, when the volume of the titanium compound exceeds 4% by volume, the sinterability of the powder raw material is lowered due to the presence of such an excessive titanium compound and a nonuniform part is formed in the resultant sintered body, thereby resulting in a reduction in the strength.

In order to obtain the silicon nitride sintered body of the present invention, a sintering aid capable of forming a liquid phase through the reaction with $SiO_2$ present on the surface of the source powder of silicon nitride at a lowest possible temperature is used and such a sintering aid is exemplified by $Y_2O_3$, $Al_2O_3$, MgO, $CeO_2$, CaO, spinel or the like. A starting material powder mixture is molded into a green compact and subjected to sintering at a temperature not exceeding 1650° C. in a nitrogen gas atmosphere or other non-oxidizing atmosphere. Further, the sintered body is preferably subjected to secondary sintering in a pressurized non-oxidizing atmosphere for further densification of the sintered body. The secondary sintering may be performed immediately after the first sintering or after cooling the first sintered body to room temperature.

In the present invention, as the starting material for the dispersed compound particles, exemplified by nitrides such as TiN, etc., compound powders, such as $TiO_2$ powder or other oxide powder, capable of forming the dispersed compound particles during the sintering step are preferably used, although TiN powder or other nitride powder per se can also be used as the starting material. Especially when $TiO_2$ powder is used as the starting material, its primary particle size is preferably 0.2 $\mu$m or less to form dispersed particles containing TiN having an average particle size of 0.1 $\mu$m or less.

In the present invention, since the dispersed particles, such as Ti compounds, etc., effectively prevent the grain growth during the sintering process, the aforestated uniform fine structure comprising the β-type prismatic crystal grains and α-type equi-axed crystal gains of silicon nitride and/or sialon can be obtained without requiring the use of an expensive fine silicon nitride source material powder having a high percentage a crystallization. Since a low sintering temperature of 1650° C. or less can be employed, a continuous sintering furnace of pusher type or belt type or the like which is suitable for the mass production can be used. Therefore, it is unnecessary to conduct sintering in a pressurized atmosphere in order to suppress the sublimation of silicon nitride. Further, a highly densified sintered body having high strength can be easily obtained without sintering through a hot isostatic pressing (HIP). Therefore, the sintered body of the present invention is also advantageous in respect of productivity and cost.

Now, the present invention will be more specifically described with reference to the following examples.

EXAMPLE 1

A commercially available $Si_3N_4$ powder having an average grain size of 0.7 μm and a percentage a crystallization of 85% was mixed with sintering aid powders consisting of $Y_2O_3$ powder $Al_2O_3$ powder and MgO powder in the mixing ratios shown in Table 1. To each of the resultant mixtures, $TiO_2$ powder having a primary particle size of 30 nm was added as a source material for dispersed particles, in the amount shown in Table 1. The added amount of $TiO_2$ is shown by weight percentage (wt. %) based on the total weight of the other starting powder materials, excluding $TiO_2$. Hereinafter, the amounts of $TiO_2$ or other source materials to be dispersed as fine particles in the resultant sintered bodies are all represented by weight percent based on the total weight of other starting powder materials. The above powders were wet-mixed in ethanol for 100 hours in a nylon ball mill and subjected to CIP (Cold Isostatic Press) molding under a pressure of 3000 kg/cm².

Each green compact thus molded was subjected to primary sintering in a nitrogen gas atmosphere under a pressure of 1 atm at 1500° C. for 4 hours and, then, subjected to secondary sintering in a nitrogen gas atmosphere under a pressure of 1000 atm at 1600° C. for 1 hour. 15 bending test pieces each having a size of 3 mm×4 mm×40 mm were cut out of each sintered body and finished through grinding with a #800 grinding diamond wheel. The three-point bending strength test was conducted for each test piece at room temperature according to JIS R 1601 and the average bending strength and Weibull coefficient were measured. For each sintered body, the relative density was measured and the $\alpha, \alpha' : \beta, \beta'$ ratio of two types of crystals was obtained from the ratio of the peak intensities of α- (including α') equi-axed crystals to β- (including β'-)prismatic crystals, namely $(I_\alpha + I_{\alpha'}) : (I_\beta + I_{\beta'})$ wherein $I_\alpha, I_{\alpha'}, I_\beta$ and $I_{\beta'}$ are the respective peak intensities of α- and α'- equi-axed crystals and β- and β'- prismatic crystals, measured by X-ray diffraction.

In order to measure the average diameters of equi-axed grains of $\alpha$-$Si_3N_4$ and/or α'-sialon and prismatic grains of $\beta$-$Si_3N_4$ and/or β'-sialon, each sintered body was subjected to lapping and etching treatments at its arbitrary surface and the thus treated surface was observed at 10 areas thereof under a scanning electron microscope (magnification: ×5,000). The average diameters of the equi-axed grains of $\alpha$-$Si_3N_4$ and/or α'-sialon were determined by measuring the average diameters of circular grains. The average diameter in minor axis of the prismatic grains of $\beta$-$Si_3N_4$ and/or β'-sialon was determined from the average diameters in the direction of the minor axis of square-shaped or rectangular grains and the average diameter in major axis of the prismatic grains was determined from the average diameters in the direction of the major axis of rectangular grains. Further, the average particle sizes and volume proportions (vol. %) of Ti compounds present in the grain boundary phase were determined from observation of 10 areas with a transmission electron microscopy (magnification: ×40,000). The volume proportion of the Ti compounds present in the grain boundary phase to the rest of the sintered body was calculated by raising the area proportion of the Ti compounds in the grain boundary phase to the 3/2 power, i.e, $$\sqrt{\text{area proportion of Ti compounds in grain boundary phase}^3}.$$

TABLE 1

| Sample | $Si_3N_4$ (wt. %) | $Y_2O_3$ (wt. %) | $Al_2O_3$ (wt. %) | MgO (wt. %) | $TiO_2$ (wt. %) |
|---|---|---|---|---|---|
| 1 | 91 | 5 | 3 | 1 | 0.1 |
| 2 | 91 | 5 | 3 | 1 | 0.2 |
| 3 | 91 | 5 | 3 | 1 | 1.0 |
| 4 | 91 | 5 | 3 | 1 | 5.0 |
| 5 | 91 | 5 | 3 | 1 | 8.0 |
| 6 | 93 | 4 | 2 | 1 | 0.6 |
| 7 | 98 | 1 | 0.5 | 0.5 | 0.4 |
| 8* | 91 | 5 | 3 | 1 | 0 |
| 9* | 91 | 5 | 3 | 1 | 0.02 |
| 10* | 91 | 5 | 3 | 1 | 15.0 |
| 11* | 91 | 5 | 3 | 1 | 20.0 |

*Comparative Samples

TABLE 2

| Sample | Relative density (%) | Ratio of $\alpha,\alpha':\beta,\beta'$ | Equi-axed crystal grain size (nm) | Prismatic crystal grain size | | Dispersed Ti compounds | |
|---|---|---|---|---|---|---|---|
| | | | | Minor axis (nm) | Major axis (μm) | Particle size (nm) | Volume proportion (vol. %) |
| 1 | 99.2 | 15:85 | 350 | 250 | 2.0 | 30 | 0.05 |
| 2 | 99.4 | 15:85 | 300 | 240 | 2.0 | 30 | 0.1 |
| 3 | 99.2 | 13:87 | 300 | 230 | 2.0 | 30 | 0.5 |
| 4 | 99.1 | 9:91 | 250 | 200 | 2.0 | 50 | 2.4 |
| 5 | 99.4 | 8:92 | 250 | 200 | 1.5 | 90 | 4.0 |
| 6 | 99.3 | 17:83 | 250 | 200 | 2.0 | 40 | 0.3 |
| 7 | 99.1 | 17:83 | 300 | 250 | 2.0 | 30 | 0.2 |
| 8* | 99.0 | 16:84 | 400 | 330 | 2.5 | — | 0 |

TABLE 2-continued

| Sample | Relative density (%) | Ratio of $\alpha,\alpha':\beta,\beta'$ | Equi-axed crystal grain size (nm) | Prismatic crystal grain size Minor axis (nm) | Prismatic crystal grain size Major axis ($\mu$m) | Dispersed Ti compounds Particle size (nm) | Dispersed Ti compounds Volume proportion (vol. %) |
|---|---|---|---|---|---|---|---|
| 9* | 99.0 | 9:91 | 320 | 290 | 2.5 | 30 | 0.01 |
| 10* | 97.2 | 9:91 | 300 | 300 | 1.5 | 350 | 7.0 |
| 11* | 96.9 | 5:95 | 300 | 330 | 1.0 | 400 | 10.0 |

*Comparative Samples

TABLE 3

| Sample | Bending strength (kg/mm$^2$) | Weibull coefficient |
|---|---|---|
| 1 | 175 | 24 |
| 2 | 190 | 25 |
| 3 | 213 | 29 |
| 4 | 180 | 24 |
| 5 | 170 | 23 |
| 6 | 172 | 22 |
| 7 | 176 | 26 |
| 8* | 130 | 17 |
| 9* | 115 | 15 |
| 10* | 111 | 10.2 |
| 11* | 100 | 9.5 |

*Comparative Samples

It is clear from the above results that the samples of the present invention all have a high bending strength of at least 170 kg/mm$^2$ and, as shown from a Weibull coefficient of at least 22, scattering in their strength values is small. In contrast to this, it is clear that comparative samples 8 and 9 are not improved in their strength because of insufficient volume percentage of the dispersed particles and comparative samples 10 and 11 are subjected to strength reduction because of excessively high volume percentages of the dispersed particles and too large particle sizes of the same.

EXAMPLE 2

The same starting material powders as those used in Example 1 were mixed in the respective mixing ratios shown in Table 4. Sample Nos. 2 and 8 had the same compositions as those in Example 1. The resultant mixtures were molded in the same manner as described in Example 1 and were subjected to primary sintering and secondary sintering in a nitrogen gas atmosphere under the conditions shown in Table 5.

TABLE 4

| Sample | Si$_3$N$_4$ (wt. %) | Y$_2$O$_3$ (wt. %) | Al$_2$O$_3$ (wt. %) | MgO (wt. %) | TiO$_2$ (wt. %) |
|---|---|---|---|---|---|
| 2 | 91 | 5 | 3 | 1 | 0.2 |
| 12 | 91 | 5 | 3 | 1 | 0.8 |
| 13 | 89 | 6 | 4 | 1 | 2.1 |
| 14 | 85 | 10 | 4 | 1 | 6.3 |
| 8* | 91 | 5 | 3 | 1 | 0 |
| 15* | 89 | 6 | 4 | 1 | 10.5 |

*Comparative Samples

TABLE 5

| Sample | Primary sintering conditions Temp. (°C.) | Primary sintering conditions Pressure (atm) | Secondary sintering conditions Temp. (°C.) | Secondary sintering conditions Pressure (atm) |
|---|---|---|---|---|
| 2-A | 1525 | 1 | 1600 | 500 |
| 2-B | 1550 | 10 | 1650 | 10 |
| 2-C | 1475 | 1 | 1700 | 5 |
| 2-D | 1475 | 1 | 1600 | 1000 |
| 2-E | 1600 | 1 | 1600 | 50 |
| 12-F | 1475 | 1 | 1575 | 1000 |
| 13-G | 1500 | 2 | 1600 | 100 |
| 14-H | 1450 | 1 | 1650 | 30 |
| 14-I | 1575 | 1 | 1750 | 5 |
| 8-J* | 1550 | 1 | 1650 | 10 |
| 8-K* | 1500 | 1 | 1700 | 5 |
| 15-L* | 1600 | 1 | 1600 | 50 |
| 15-M* | 1475 | 1 | 1600 | 1000 |

*Comparative Samples

Each sample of the thus obtained sintered bodies was measured for relative density, $\alpha$, $\alpha':\beta$, $\beta'$ ratio, average grain sizes in the major axis and minor axis of prismatic crystal grains of $\beta$-Si$_3$N$_4$ and/or $\beta'$-sialon, average grain size of equi-axed crystal grains of $\alpha$-Si$_3$N$_4$ and/or $\alpha'$-sialon, average particle size of the dispersed particles and volume percentage (vol. %) of the dispersed particles in the grain boundary phase on the basis of the total volume of the rest (excluding the dispersed particles) of the sintered body, in the same manner as described in Example 1. Further, the three-point bending strength and Weibull coefficient were measured for each sample at room temperature in the same procedures as set forth in Example 1. The results are given in Tables 6 and 7.

TABLE 6

| Sample | Relative density (%) | Ratio of $\alpha,\alpha':\beta,\beta'$ | Equi-axed crystal grain size (nm) | Prismatic crystal grain size Minor axis (nm) | Prismatic crystal grain size Major axis ($\mu$m) | Dispersed Ti compounds Particle size (nm) | Dispersed Ti compounds Volume proportion (vol. %) |
|---|---|---|---|---|---|---|---|
| 2-A | 99.2 | 16:84 | 300 | 230 | 2.0 | 30 | 0.1 |
| 2-B | 99.0 | 4:96 | 300 | 250 | 1.7 | 30 | 0.1 |
| 2-C | 98.8 | 19:81 | 350 | 200 | 2.5 | 30 | 0.1 |
| 2-D | 99.3 | 10:90 | 250 | 200 | 2.0 | 30 | 0.1 |
| 2-E | 99.2 | 10:90 | 300 | 200 | 2.0 | 30 | 0.1 |
| 12-F | 99.5 | 17:83 | 200 | 200 | 2.5 | 30 | 0.4 |
| 13-G | 99.0 | 16:84 | 300 | 250 | 2.0 | 60 | 1.0 |
| 14-H | 98.5 | 10:90 | 350 | 200 | 1.8 | 100 | 3.0 |
| 14-I | 98.9 | 16:84 | 350 | 200 | 2.3 | 60 | 3.0 |
| 8-J* | 97.5 | 25:75 | 500 | 300 | 1.5 | — | 0 |

TABLE 6-continued

| Sample | Relative density (%) | Ratio of $\alpha,\alpha':\beta,\beta'$ | Equi-axed crystal grain size (nm) | Prismatic crystal grain size Minor axis (nm) | Prismatic crystal grain size Major axis (μm) | Dispersed Ti compounds Particle size (nm) | Dispersed Ti compounds Volume proportion (vol. %) |
|---|---|---|---|---|---|---|---|
| 8-K* | 98.5 | 16:84 | 300 | 300 | 1.6 | — | 0 |
| 15-L* | 96.2 | 7:93 | 450 | 200 | 1.0 | 200 | 5.0 |
| 15-M* | 98.3 | 1:99 | 450 | 350 | 1.0 | 200 | 5.0 |

*Comparative Samples

TABLE 7

| Sample | Bending strength (kg/mm$^2$) | Weibull coefficient |
|---|---|---|
| 2-A | 180 | 23 |
| 2-B | 181 | 21 |
| 2-C | 160 | 20 |
| 2-D | 200 | 25 |
| 2-E | 175 | 24 |
| 12-F | 213 | 27 |
| 13-G | 165 | 25 |
| 14-H | 162 | 24 |
| 14-I | 160 | 22 |
| 8-J* | 120 | 9 |
| 8-K* | 116 | 11 |
| 15-L* | 115 | 11 |
| 15-M* | 120 | 7 |

*Comparative Samples

EXAMPLE 3

Compositions as shown in Table 8 were prepared using the same starting materials as used in Example 1 except that the primary particle size of the TiO$_2$ powder was varied as shown in Table 8. Similarly to Example 1, each powder mixture was molded into a green compact and subjected to primary sintering in a 1atm nitrogen gas atmosphere at 1500° C. for 4 hours and, then, secondary sintering in a 1000-atm nitrogen gas atmosphere at 1600° C. for one hour.

TABLE 8

| Sample | Si$_3$N$_4$ (wt. %) | Y$_2$O$_3$ (wt. %) | Al$_2$O$_3$ (wt. %) | MgO (wt. %) | TiO$_2$ (wt. %) | TiO$_2$ (nm**) |
|---|---|---|---|---|---|---|
| 16-1 | 91 | 5 | 3 | 1 | 0.4 | 15 |
| 16-2 | 91 | 5 | 3 | 1 | 0.4 | 30 |
| 16-3* | 91 | 5 | 3 | 1 | 0.4 | 300 |
| 17-1 | 89 | 5 | 4 | 2 | 0.4 | 15 |
| 17-2 | 89 | 5 | 4 | 2 | 0.4 | 50 |
| 17-3* | 89 | 5 | 4 | 2 | 0.4 | 200 |
| 18-1 | 89 | 6 | 4 | 1 | 2.1 | 100 |
| 18-2* | 89 | 6 | 4 | 1 | 2.1 | 500 |

*Comparative Samples
**Primary particle size

Each sample of the thus obtained sintered bodies was measured for relative density, $\alpha$, $\alpha':\beta$, $\beta'$ ratio, average grain sizes in the major axis and minor axis of prismatic crystal grains of $\beta$-Si$_3$N$_4$ and/or $\beta'$-sialon, average grain size of equi-axed crystal grains of $\alpha$-Si$_3$N$_4$ and/or $\alpha'$-sialon, average particle size of the dispersed particles and volume percentage (vol. %) of the dispersed particles in the grain boundary phase on the basis of the total volume of the rest (excluding the dispersed particles) of the sintered body, in the same manner as described in Example 1. Further, the three-point bending strength and Weibull coefficient were measured for each sample at room temperature in the same procedures as set forth in Example 1. The results are given in Tables 9 and 10.

TABLE 9

| Sample | Relative density (%) | Ratio of $\alpha,\alpha':\beta,\beta'$ | Equi-axed crystal grain size (nm) | Prismatic crystal grain size Minor axis (nm) | Prismatic crystal grain size Major axis (μm) | Dispersed Ti compounds Particle size (nm) | Dispersed Ti compounds Volume proportion (vol. %) |
|---|---|---|---|---|---|---|---|
| 16-1 | 99.4 | 11:89 | 350 | 250 | 2.0 | 15 | 0.2 |
| 16-2 | 99.3 | 16:84 | 300 | 200 | 2.0 | 20 | 0.2 |
| 16-3* | 97.5 | 21:79 | 300 | 250 | 1.5 | 300 | 0.2 |
| 17-1 | 99.5 | 14:86 | 250 | 200 | 2.0 | 15 | 0.3 |
| 17-2 | 99.1 | 15:85 | 250 | 200 | 1.8 | 50 | 0.3 |
| 17-3* | 96.2 | 16:84 | 320 | 250 | 1.5 | 250 | 0.3 |
| 18-1 | 99.3 | 14:86 | 330 | 250 | 2.0 | 100 | 1.0 |
| 18-2* | 98.2 | 16:84 | 400 | 350 | 1.5 | 500 | 1.0 |

*Comparative Samples

TABLE 10

| Sample | Bending strength (kg/mm$^2$) | Weibull coefficient |
|---|---|---|
| 16-1 | 192 | 22 |
| 16-2 | 171 | 20 |
| 16-3* | 123 | 8 |
| 17-1 | 189 | 23.6 |
| 17-2 | 196 | 25.3 |
| 17-3* | 143 | 12 |
| 18-1 | 161 | 21 |
| 18-2* | 139 | 16.2 |

*Comparative Samples

The above results reveal that when TiO$_2$ powder having a large primary particle size is used as a source material powder for Ti compounds dispersed particles, the particle dispersed in the resultant sintered body also have a large particle size. When the average particle size of the dispersed particles exceeds 0.1 μm, the bending strength and Weibull coefficient decrease and scattering in the properties becomes significant.

EXAMPLE 4

Compositions as shown in Table 11 were prepared using the same starting materials as used in Example 1 except that the primary particles size of the TiO$_2$ powder was varied as shown in Table 11. Samples 4, 8 and 11 had the same compositions as those used in Example 1. Similarly to Example 1, each powder mixture was molded into a green compact and subjected to primary sintering in a 1-atm nitrogen gas atmosphere at 1500° C. for 4 hours and, then, secondary sintering in a 1000-atm nitrogen gas atmosphere at 1575° C. for one hour.

TABLE 11

| Sample | $Si_3N_4$ (wt. %) | $Y_2O_3$ (wt. %) | $Al_2O_3$ (wt. %) | MgO (wt. %) | $TiO_2$ (wt. %) | $TiO_2$ (nm**) |
|---|---|---|---|---|---|---|
| 4 | 91 | 5 | 3 | 1 | 5.0 | 15 |
| 19 | 91 | 5 | 3 | 1 | 0.4 | 100 |
| 8* | 91 | 5 | 3 | 1 | 0 | — |
| 11* | 91 | 5 | 3 | 1 | 20.0 | 30 |

*Comparative Samples
**Primary particle size

Test chips were cut from the respective sintered body and subjected to a cutting test under the conditions shown in Table 12. The respective test results are shown in Table 13. The criterion of the judgment on the life of the chips was made by measuring the cutting time providing a flank wear width of 0.3 mm.

TABLE 12

|   | Cutting test 1 | Cutting test 2 |
|---|---|---|
| Cutting work | Lathing (wet-type) | Milling (wet-type) |
| Material to be machined | FC25($H_B$180) | FC25($H_B$200) |
| Cutting speed | 800 m/min | 400 m/min |
| Feed | 1 mm/rev. | 0.5 mm/tip |
| Depth of cut | 2 mm | 4 mm |

TABLE 13

| | Life of Chips (min) | |
|---|---|---|
| Sample | Cutting Test 1 | Cutting Test 2 |
| 4 | 35 | 55 |
| 19 | 40 | 50 |
| 8* | 5 | 10 |
| 11* | 3 | 7 |

*Comparative samples

It can be seen from the above results that the silicon nitride sintered bodies of the present invention exhibit superior cutting performance both in continuous cutting and intermittent cutting and is suitable as cutting tools.

Example 5

The respective oxide powders as shown in Table 14 were used as source powders for dispersed particles. Each oxide powder was mixed with the other starting material powders, which were the same as those used in Example 1, in the mixing ratios specified in Table 14. Each of the resulting powder mixtures was molded into a green compact and subjected to primary sintering in a 1-atm nitrogen gas atmosphere at 1500° C. for 4 hours and, then, secondary sintering in a 1000-atm nitrogen gas atmosphere at 1600° C. for one hour.

TABLE 14

| Sample | $Si_3N_4$ (wt. %) | $Y_2O_3$ (wt. %) | $Al_2O_3$ (wt. %) | MgO (wt. %) | Added oxide (wt. %) |
|---|---|---|---|---|---|
| 20 | 91 | 5 | 3 | 1 | $ZrO_2$ 1.8 |
| 21 | 91 | 5 | 3 | 1 | $HfO_2$ 1.0 |
| 22 | 91 | 5 | 3 | 1 | $V_2O_3$ 1.0 |
| 23 | 91 | 5 | 3 | 1 | $Cr_2O_3$ 1.0 |

Each sample of the thus obtained sintered bodies was measured for relative density, $\alpha, \alpha' : \beta, \beta'$ ratio, average grain sizes in the major axis and minor axis of prismatic crystal grains of $\beta$-$Si_3N_4$ and/or $\beta'$-sialon, average grain size of equi-axed crystal grains of $\alpha$-$Si_3N_4$ and/or $\alpha'$-sialon, average particle size of the dispersed particles and volume percentage (vol. %) of the dispersed particles in the grain boundary phase on the basis of the total volume of the rest (excluding the dispersed particles) of the sintered body, in the same manner as described in Example 1. Further, the three-point bending strength and Weibull coefficient were measured for each sample at room temperature in the same procedures as set forth in Example 1. The results are given in Tables 15 and 16.

TABLE 15

| Sample | Relative density (%) | Ratio of $\alpha, \alpha':\beta, \beta'$ | Equi-axed crystal grain size (nm) | Prismatic crystal grain size Minor axis (nm) | Prismatic crystal grain size Major axis (μm) | Dispersed compounds Particle size (nm) | Dispersed compounds Volume proportion (vol. %) |
|---|---|---|---|---|---|---|---|
| 20 | 99.5 | 7:93 | 300 | 250 | 2.0 | 50 | 0.2 |
| 21 | 99.3 | 8:92 | 300 | 200 | 1.5 | 100 | 0.2 |
| 22 | 99.4 | 10:90 | 300 | 250 | 1.8 | 100 | 0.2 |
| 23 | 99.3 | 5:95 | 300 | 250 | 1.5 | 100 | 0.2 |

*Comparative Samples

TABLE 16

| Sample | Bending strength (kg/mm$^2$) | Weibull coefficient |
|---|---|---|
| 20 | 170 | 23 |
| 21 | 165 | 20 |
| 22 | 167 | 20 |
| 23 | 165 | 23 |

EXAMPLE 6

A commercially available $Si_3N_4$ powder having an average grain size of 0.7 μm was mixed with compounds of Y, Al and Mg in the mixing ratios, by weights in terms of their oxides, shown in Table 17. To each mixture, titanium oxide powder having a primary particle size of 15 nm was added, as a source material for dispersed particles, in the amount shown in Table 17. The above powders were wet-mixed in ethanol for 100 hours in a nylon ball mill and subjected to CIP molding under a pressure of 3000 kg/cm$^2$.

TABLE 17

| Samples | $Si_3N_4$ (wt. %) | Y $Y_2O_3$ (wt. %) | Al $Al_2O_3$ (wt. %) | Mg MgO (wt. %) | $TiO_2$ (wt. %) |
|---|---|---|---|---|---|
| Samples of the present invention | | | | | |
| 1 | 91 | 5 | 3 | 1 | 0.1 |
| 2 | 91 | 5 | 3 | 1 | 0.2 |
| 3 | 91 | 5 | 3 | 1 | 1.0 |
| 4 | 91 | 5 | 3 | 1 | 2.0 |
| 5 | 91 | 5 | 3 | 1 | 4.0 |
| 6 | 93 | 4 | 2 | 1 | 0.7 |

TABLE 17-continued

| Samples | Si$_3$N$_4$ (wt. %) | Y Y$_2$O$_3$ (wt. %) | Al Al$_2$O$_3$ (wt. %) | Mg MgO (wt. %) | TiO$_2$ (wt. %) |
|---|---|---|---|---|---|
| 7 | 98 | 1 | 0.5 | 0.5 | 0.4 |
| Comparative samples | | | | | |
| 1 | 91 | 5 | 3 | 1 | 0 |
| 2 | 91 | 5 | 3 | 1 | 0.02 |
| 3 | 91 | 5 | 3 | 1 | 15.0 |
| 4 | 91 | 5 | 3 | 1 | 20.0 |

Each of the green compacts shown in Table 17 was subjected to primary sintering in a nitrogen gas atmosphere under a pressure of 1-atm at t 1500° C. for 4 hours and, then, subjected to secondary sintering in a nitrogen gas atmosphere under a pressure of 1000 atm at 1575° C. for 1 hour.

Each sample of the thus obtained sintered bodies was measured for relative density, $\alpha$, $\alpha':\beta$, $\beta'$ ratio, average grain sizes in the major axis and minor axis of prismatic crystal grains of $\beta$-Si$_3$N$_4$ and/or $\beta'$-sialon, average grain size of equi-axed crystal grains of $\alpha$-Si$_3$N$_4$ and/or $\alpha'$-sialon, average particle size of the dispersed particles and volume percentage (vol. %) of the dispersed particles in the grain boundary phase on the basis of the total volume of the rest (excluding the dispersed particles) of the sintered body, in the same manner as described in Example 1. Further, the three-point bending strength and Weibull coefficient were measured for each sample at room temperature in the same procedures as set forth in Example 1. The results are shown in Table 18.

TABLE 18

| Samples | Relative density* (%) | $\alpha$, $\alpha':\beta$, $\beta'$ | 3-Point bending strength (kg/mm$^2$) | Weibull coefficient | Equi-axed crystal grain size (nm) | Prismatic crystal grain size | | Dispersed Ti compounds | |
|---|---|---|---|---|---|---|---|---|---|
| | | | | | | Minor axis (nm) | Major axis ($\mu$m) | Particle size (nm) | Volume proportion (vol. %) |
| Samples of the present invention | | | | | | | | | |
| 1 | 99.3 | 17:83 | 185 | 24.5 | 350 | 250 | 2.0 | 15 | 0.05 |
| 2 | 99.5 | 16:84 | 200 | 28 | 300 | 240 | 2.0 | 15 | 0.1 |
| 3 | 99.2 | 14:86 | 235 | 29 | 300 | 230 | 2.0 | 15 | 0.5 |
| 4 | 99.1 | 11:89 | 190 | 26 | 250 | 200 | 2.0 | 20 | 1.0 |
| 5 | 99.3 | 9:81 | 180 | 27 | 250 | 200 | 2.0 | 30 | 2.0 |
| 6 | 99.4 | 16:84 | 204 | 26 | 320 | 250 | 2.0 | 30 | 0.3 |
| 7 | 99.1 | 17:83 | 186 | 27 | 300 | 260 | 2.0 | 20 | 0.2 |
| Comparative samples | | | | | | | | | |
| 1 | 99.0 | 19:81 | 135 | 18.5 | 400 | 330 | 2.5 | — | 0 |
| 2 | 99.0 | 9:91 | 121 | 18 | 300 | 290 | 2.5 | 15 | 0.01 |
| 3 | 97.2 | 9:91 | 120 | 10.2 | 300 | 300 | 1.5 | 200 | 7.0 |
| 4 | 97.0 | 5:95 | 105 | 9.5 | 300 | 300 | 1.0 | 300 | 10.0 |

*Relative density of secondary sintered body

EXAMPLE 7

Green compacts having the compositions shown in Table 19 were prepared by using the same powders as used in Example 6 and subjected to primary sintering in a nitrogen gas and secondary sintering in a nitrogen gas, under the conditions specified in Table 20. The secondary sintering may be performed either immediately after the primary sintering or after cooling each primary sintered body to room temperature, under the specified secondary sintering conditions.

Each sample of the thus obtained sintered bodies was measured for relative density, $\alpha$, $\alpha':\beta$, $\beta'$ ratio, average grain sizes in the major axis and minor axis of prismatic crystal grains of $\beta$-Si$_3$N$_4$ and/or $\beta'$-sialon, average grain size of equi-axed crystal grains of $\alpha$-Si$_3$N$_4$ and/or $\alpha'$-sialon, average particle size of the dispersed particles and volume percentage (vol. %) of the dispersed particles in the grain boundary phase on the basis of the total volume of the rest (excluding the dispersed particles) of the sintered body, in the same manner as described in Example 1. Further, the three-point bending strength and Weibull coefficient were measured for each sample at room temperature in the same procedures as set forth in Example 1. The results are shown in Table 21.

TABLE 19

| Samples | Si$_3$N$_4$ (wt. %) | Y Y$_2$O$_3$ (wt. %) | Al Al$_2$O$_3$ (wt. %) | Mg MgO (wt. %) | TiO$_2$ (wt. %) |
|---|---|---|---|---|---|
| Samples of the present invention | | | | | |
| 2 | 91 | 5 | 3 | 1 | 0.2 |
| 8 | 91 | 5 | 3 | 1 | 0.8 |
| 9 | 91 | 6 | 4 | 1 | 2.1 |
| 10 | 91 | 10 | 4 | 1 | 3.2 |
| Comparative samples | | | | | |
| 1 | 91 | 5 | 3 | 1 | — |
| 5 | 89 | 6 | 4 | 1 | 10.5 |

TABLE 20

| Sample | Primary sintering | | Secondary sintering | |
|---|---|---|---|---|
| | Temp. (°C.) | Pressure (atm) | Temp. (°C.) | Pressure (atm) |
| Samples of the present invention | | | | |
| 2-A | 1525 | 1 | 1600 | 500 |
| 2-B | 1550 | 10 | 1650 | 10 |
| 2-C | 1475 | 1 | 1700 | 5 |
| 2-D | 1475 | 1 | 1600 | 1000 |
| 2-E | 1600 | 1 | 1600 | 50 |
| 8-F | 1475 | 1 | 1575 | 1000 |
| 9-G | 1500 | 2 | 1600 | 100 |
| 10-H | 1450 | 1 | 1650 | 30 |
| 10-I | 1575 | 1 | 1750 | 5 |
| Comparative samples | | | | |
| 1-J | 1550 | 1 | 1650 | 10 |
| 1-K | 1500 | 1 | 1700 | 5 |
| 5-L | 1600 | 1 | 1600 | 50 |
| 5-M | 1474 | 1 | 1600 | 1000 |

TABLE 21

| Sample | Relative density* (%) | α, α':β, β' | 3-Point bending strength (kg/mm²) | Weibull coefficient | Equi-axed crystal grain size (nm) | Prismatic crystal grain size | | Dispersed Ti compounds | |
|---|---|---|---|---|---|---|---|---|---|
| | | | | | | Minor axis (nm) | Major axis (μm) | Particle size (nm) | Volume proportion (vol. %) |
| Samples of the present invention | | | | | | | | | |
| 2-A | 99.3 | 17:83 | 193 | 24.2 | 350 | 250 | 2.0 | 15 | 0.1 |
| 2-B | 99.1 | 5:95 | 190 | 23 | 350 | 280 | 1.8 | 15 | 0.1 |
| 2-C | 98.9 | 19:81 | 170 | 22 | 400 | 300 | 2.4 | 15 | 0.1 |
| 2-D | 99.5 | 11:89 | 213 | 26 | 250 | 200 | 2.0 | 15 | 0.1 |
| 2-E | 99.2 | 10:90 | 179 | 25 | 300 | 250 | 2.0 | 15 | 0.1 |
| 8-F | 99.6 | 15:85 | 225 | 28.3 | 250 | 200 | 1.8 | 15 | 0.4 |
| 9-G | 99.0 | 18:82 | 175 | 26 | 300 | 260 | 2.0 | 20 | 1.0 |
| 10-H | 98.9 | 12:88 | 177 | 25.5 | 400 | 300 | 1.5 | 30 | 1.5 |
| 10-I | 99.2 | 19:81 | 170 | 24 | 420 | 300 | 2.5 | 50 | 1.5 |
| Comparative samples | | | | | | | | | |
| 1-J | 97.5 | 25:75 | 120 | 9 | 500 | 300 | 1.5 | — | — |
| 1-K | 98.5 | 16:84 | 116 | 11 | 300 | 300 | 1.6 | — | — |
| 5-L | 96.2 | 9:91 | 125 | 13 | 500 | 200 | 1.0 | 100 | 5.0 |
| 5-M | 98.3 | 3:97 | 130 | 8 | 500 | 400 | 1.0 | 100 | 5.0 |

*Relative density of secondary sintered body

EXAMPLE 8

Using three different kinds of compositions as shown in Table 22, sintered bodies were prepared by performing primary sintering in a 1-atm nitrogen gas at 1500° C. for 1 hr and secondary sintering in a 500-atm nitrogen gas at 1600° C. for 4 hr. In the compositions, the primary particle size of titanium oxide was changed as shown in Table 22.

Each sample of the thus obtained sintered bodies was measured for relative density, α, α':β, β' ratio, average grain sizes in the major axis and minor axis of prismatic crystal grains of β-$Si_3N_4$ and/or β'-sialon, average grain size of equi-axed crystal grains of α-$Si_3N_4$ and/or α'-sialon, average particle size of the dispersed particles and volume percentage (vol. %) of the dispersed particles in the grain boundary phase on the basis of the total volume of the rest (excluding the dispersed particles) of the sintered body, in the same manner as described in Example 1. Further, the three-point bending strength and Weibull coefficient were measured for each sample at room temperature in the same procedures as set forth in Example 1. The results are shown in Table 23.

TABLE 22

| Sample | $Si_3N_4$ (wt. %) | Y $Y_2O_3$ (wt. %) | Al $Al_2O_3$ (wt. %) | Mg MgO (wt. %) | $TiO_2$ | |
|---|---|---|---|---|---|---|
| | | | | | (wt. %) | (nm)** |
| 11-1 | 91 | 5 | 3 | 1 | 0.4 | 15 |
| 11-2 | 91 | 5 | 3 | 1 | 0.4 | 30 |
| 11-3* | 91 | 5 | 3 | 1 | 0.4 | 100 |
| 12-1 | 89 | 5 | 4 | 2 | 0.4 | 15 |
| 12-2 | 89 | 5 | 4 | 2 | 0.4 | 50 |
| 12-3* | 89 | 5 | 4 | 2 | 0.4 | 200 |
| 13-1 | 89 | 6 | 4 | 1 | 2.1 | 15 |
| 13-2* | 89 | 6 | 4 | 1 | 2.1 | 150 |

*Comparative samples
**Primary particle size

TABLE 23

| Samples | Relative density** (%) | α, α':β, β' | 3-Point bending strength (kg/mm²) | Weibull coefficient | Equi-axed crystal grain size (nm) | Prismatic crystal grain size | | Dispersed Ti compounds | |
|---|---|---|---|---|---|---|---|---|---|
| | | | | | | Minor axis (nm) | Major axis (μm) | Particle size (nm) | Volume proportion (vol. %) |
| 11-1 | 99.4 | 11:89 | 192 | 22 | 350 | 250 | 2.0 | 15 | 0.2 |
| 11-2 | 99.3 | 16:84 | 171 | 20 | 300 | 200 | 2.0 | 20 | 0.2 |
| 11-3* | 98.6 | 19:81 | 143 | 13 | 300 | 250 | 1.8 | 80 | 0.2 |
| 12-1 | 99.5 | 14:86 | 189 | 23.6 | 250 | 200 | 2.0 | 15 | 0.3 |
| 12-2 | 99.1 | 15:85 | 196 | 25.3 | 250 | 200 | 2.0 | 50 | 0.3 |
| 13-3* | 96.2 | 16:84 | 143 | 12 | 320 | 250 | 1.5 | 200 | 0.3 |
| 13-1 | 99.5 | 16:84 | 201 | 23.6 | 300 | 260 | 2.0 | 30 | 1 |
| 13-2* | 98.2 | 16:84 | 139 | 16.2 | 400 | 350 | 1.0 | 500 | 1 |

*Comparative samples
**Relative density of secondary sintered body

EXAMPLE 9

Starting materials having the compositions shown in Table 24 were subjected to sintering at 1500° C. for 4 hr under atmospheric pressure and secondary sintering in a 1000-atm nitrogen gas atmosphere at 1575° C. for 1 hr. Each of the thus obtained sintered bodies was subjected to the Charpy impact test and fatigue test.

Figure 2:
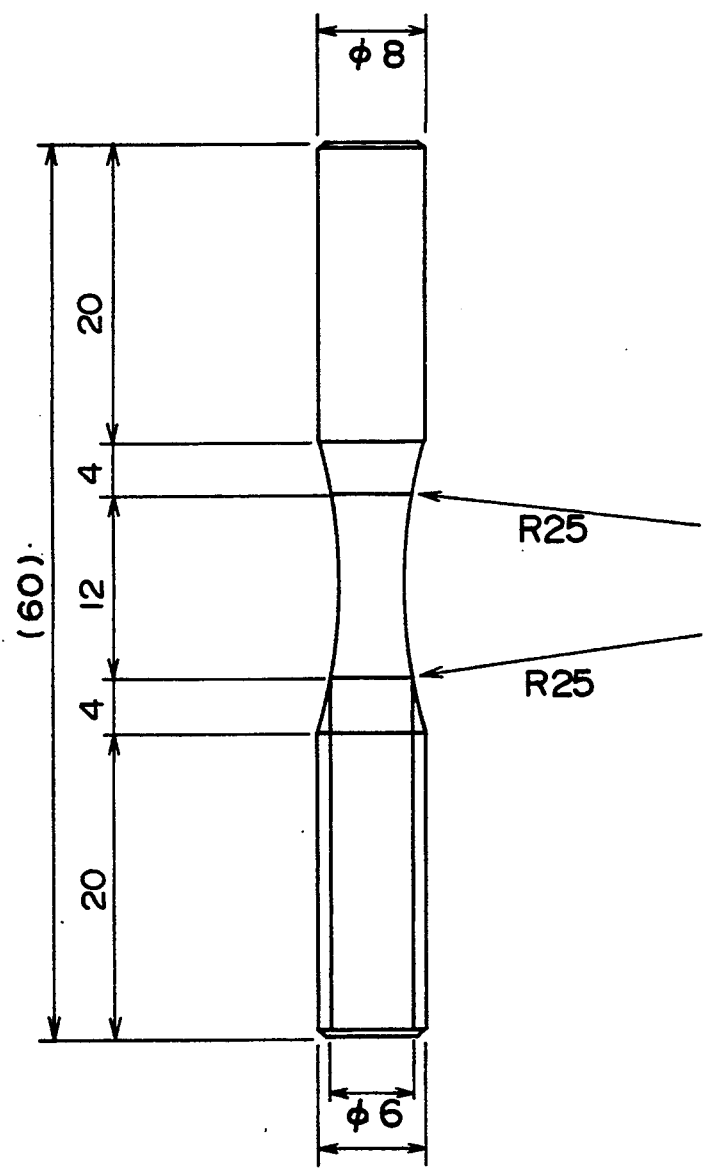
FIG. 2 is an illustration showing the configuration of a test piece for a rotating bending fatigue test.
Figure 3:
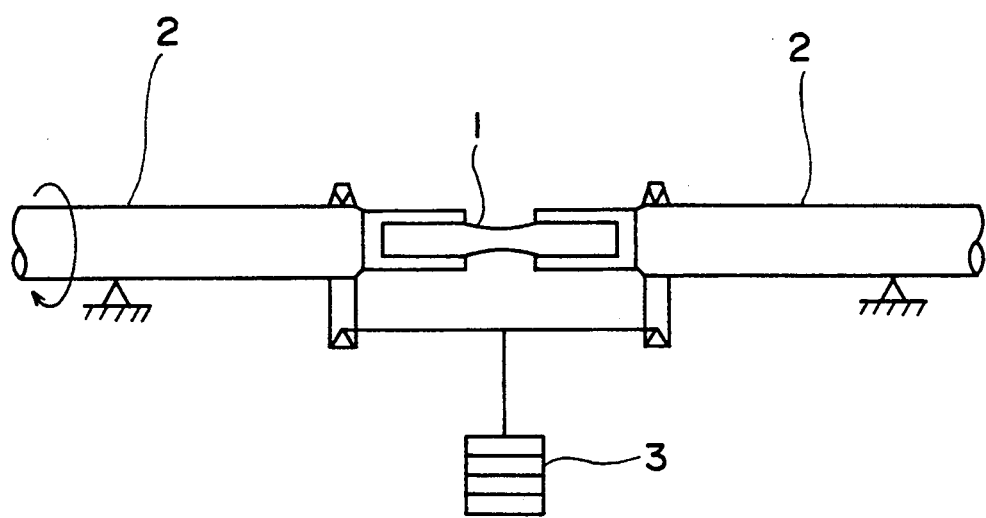
FIG. 3 is a conceptual view of a rotary bending tester.

According to JIS 1601, the Charpy test was conducted under conditions of a Charpy capacity of 1.5 kgfcm and an impact speed of 0.76 m/sec. The fatigue test was conducted in accordance with Ono's rotating bending testing method (diameter of the evaluated portion: 6 mm, diameter of the fixing portions at both ends: 8 mm and gauge length: 12 mm). The dimensions of the tested specimen are shown in millimeter units in FIG. 2 and the conceptual view of the used tester is shown in FIG. 3. In FIG. 3, reference numerals are as follows.

1: specimen, 2: specimen fixing portion, 3: weight

The results of the Charpy impact test are shown in Table 25 and the results of the fatigue test are shown in FIG. 1.

TABLE 24

| Samples | $Si_3N_4$ (wt. %) | Y $Y_2O_3$ (wt. %) | Al $Al_2O_3$ (wt. %) | Mg MgO (wt. %) | $TiO_2$ (wt. %) |
|---|---|---|---|---|---|
| Samples of the present invention | | | | | |
| 1 | 91 | 5 | 3 | 1 | 0.10 |
| 8 | 91 | 5 | 3 | 1 | 0.8 |
| Comparative samples | | | | | |
| 1 | 91 | 5 | 3 | 1 | 0 |
| 4 | 91 | 5 | 3 | 1 | 20.0 |

TABLE 25

| Samples | Charpy impact value (kgm/cm$^2$) |
|---|---|
| Samples of the Present invention | |
| 1 | 0.20 |
| 8 | 0.24 |
| Comparative samples | |
| 1 | 0.15 |
| 4 | 0.11 |

It can be seen from the above results that the samples of the present invention have a high impact value and a good fatigue strength as compared with the comparative samples.

According to the present invention, there is provided silicon nitride sintered bodies which have superior mechanical properties, such as a three-point bending strength of at least 160 kg/mm$^2$ at room temperature, with a minimized scattering in the strength properties, and also high reliability. The inventive sintered bodies also have a good productivity and an advantageous cost efficiency.

Such superior sintered bodies are especially expected as promising structural materials which can be substituted for metallic materials heretofore used in the fields requiring a high strength level at room temperature, and also as materials for cutting tools.

What is claimed is:

1. A silicon nitride sintered body consisting essentially of prismatic crystal grains of $\beta$-$Si_3N_4$ and/or $\beta'$-sialon, and equi-axised crystal grains of $\alpha$-$Si_3N_4$ and/or $\alpha'$-sialon, a grain boundary phase existing between said prismatic and equi-axised crystal grains, said grains having dispersed particles within said grain boundary phase, said dispersed particles being at least one material selected from the group consisting of compounds of Ti, Zr, Hf, V, and Cr, said prismatic crystal grains having an average minor axis of 0.3 $\mu$m or less, and an average major axis of 5 $\mu$m or less, said equi-axised crystal grains having an average grain size of 0.5 $\mu$m or less, and said dispersed particles having an average size of 0.1 $\mu$m or less, a volume of dispersed particles being 0.05% to 4.0% by volume, based on the total volume of said sintered body.

2. A silicon nitride sintered body according to claim 1, wherein the dispersed particles have an average size of 0.03 $\mu$m or less.

3. A silicon nitride sintered body according to claim 1, wherein the volume of the dispersed titanium compounds is 0.05 to 2% by volume, based on the total volume of the rest of the sintered body.

4. A silicon nitride sintered body according to claim 1, wherein the silicon nitride sintered body has a strength of 160 kg/mm$^2$ or higher in terms of the three-point bending strength at room temperature according to JIS R 1601.

* * * * *